Figure 1:
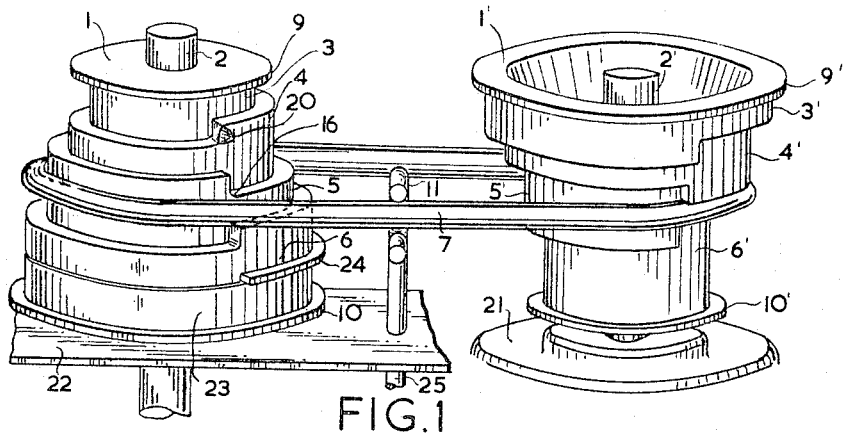

Oct. 4, 1966

K. G. ZEUTHEN 3,276,280

GEAR MECHANISM WITH A STEPWISE
VARIABLE GEARING RATIO
Filed Oct. 5, 1964

INVENTOR
Karl Gustav Zeuthen
BY Stevens, Davis, Miller & Mosher
ATTORNEYS

United States Patent Office 3,276,280
Patented Oct. 4, 1966

3,276,280
GEAR MECHANISM WITH A STEPWISE VARIABLE GEARING RATIO
Karl Gustav Zeuthen, Gentofte, Denmark, assignor to Zeuthen & Aagaard A/S, Glostrup, Denmark, a company of Denmark
Filed Oct. 5, 1964, Ser. No. 401,610
Claims priority, application Denmark, Oct. 18, 1963, 4,934/63
10 Claims. (Cl. 74—217)

The invention relates to a gear mechanism with a stepwise variable gearing ratio and comprising two parallel shafts, each with a stepped pulley, the said pulleys being interconnected by a belt which can be displaced between the steps of the stepped pulleys.

In gear mechanisms of the type mentioned above the gearing ratio can be changed by leading the belt down on to a lower step on one of the stepped pulleys, whereupon the belt on the other stepped pulley is led up on to a higher step. The number of gearing possibilities corresponds to the number of steps provided on each stepped pulley. The stepped pulleys may be made as cast or turned bodies, but may also be assembled from suitable components, e.g. so that the belt contact surfaces are formed by rod-shaped members which are placed close to each other and mounted in a ring on a disc, and the outer surfaces of which form a contact surface for the belt. The belt serves for transmitting the power between the two stepped pulleys by friction.

In gear mechanisms of the type referred to it is as a rule necessary to stop the mechanism while the gearing ratio is being changed. A belt displacement member may be used which, before the transmission mechanism is stopped, exerts a force on the belt transversely to its direction of motion in such a way that the belt on one of the stepped pulleys is brought down on to a lower step. The transmission mechanism is then stopped, and the belt is by hand or by means of a suitable tool lifted on to a higher step on the other stepped pulley. Only in special cases, preferably when the height of the step is small, is it possible to perform a change of gearing ratio during the operation of the gear mechanism, e.g. by pressing in such a way against the side of the belt, after the belt has on one stepped pulley been brought down on to a lower step and thereby slackened, that the latter is slipped onto the higher step on the other stepped pulley. Such a method of changing, entails a considerable wear on the belt and will not always give a safe and precise shift.

A gear mechanism has been proposed where the power is by means of an elastic belt transmitted between a shaft with a constant diameter and a stepped pulley. In this construction the belt is led from a lower to a higher step by a force being exerted on the belt by means of a belt displacing mechanism acting transversely to the belt. The presupposition for a change of the gearing ratio being by this construction attained during the operation is that the belt is elastic and that the distance between the shaft and the stepped pulley is large in relation to the diameter of the stepped pulley. This construction will also entail a considerable wear on the belt, as the latter is to be forced up on to a higher step, and due to the fact that an elastic belt should be used, this transmission mechanism can only transmit a limited power.

It is one object of the invention to provide a gear mechanism in which the gearing ratio can be changed quickly and accurately during the operation of the gear mechanism.

The gear mechanism according to the invention is characterized in that between every two adjacent steps the stepped pulleys are provided with a belt guiding transition zone for automatically leading the belt from a lower step to a higher step on the stepped pulleys during operation under the influence of a force acting transversely to the belt. This ensures a particularly dependable and reliable change of the gearing ratio, and for performing the change it is only necessary very briefly to exert a force transversely to the belt, and consequently the wear of the belt will be quite insignificant.

Due to the exertion of the force transversely to the belt the latter will on one stepped pulley be led down on to a lower step, and the belt will then run obliquely between the stepped pulleys, so that on the other stepped pulley it is led in towards the belt guiding zone which automatically lifts the belt on to a higher step, so that the belt will take up another operational position with another gearing ratio for the gear mechanism. Furthermore, the belt may be substantially inelastic, so that a considerable power can be transmitted by the transmission mechanism. The gear mechanism can be constructed very compactly, it being no condition for the change of gearing ratio that the shafts of the stepped pulleys are to be spaced far apart.

An embodiment of the gear mechanism according to the invention is characterized in that the width of the belt guiding zone in the axial direction of the stepped pulleys is adapted to the belt, and that the stepped pulleys in the belt guiding zone along one part of the circumference have the same radius as the adjacent higher step and on substantially the remainder of the circumference have the same radius as the lower step located at the other side of the belt guiding zone. Hereby an expedient design of the belt guiding zone is attained and at the same time a guiding of the belt in its operational position.

The force transversely to the belt required for initiating the shifting of the belt can be exerted by hand or by means of a suitable tool, but in a convenient embodiment of the gear mechanism according to the invention one or both stepped pulleys are, preferably at the leading side, provided with a guided belt displacement member arranged for stepwise movement.

Another embodiment of the gear mechanism according to the invention is characterized in that the parts of the junctions lying closest to the higher step have been removed so that a projecting edge remains in the side facing the lower step. This contributes to guiding and securing the belt during shifting of the latter.

An embodiment of the gear mechanism according to the invention is characterized in that the part of the belt guiding transition zone with the largest diameter extends for about half the circumference of the stepped pulleys, preferably more than half in the case of stepped pulleys with a small diameter. This is advantageous, particularly in view of the correct guiding of the belt in its normal operation positions. A suitable distribution of the weight along the circumference of the stepped pulleys is attained by an embodiment according to the invention which is characterized in that for every successive belt guiding transition zone the parts having the largest diameter are displaced 180° in relation to each other.

In a further embodiment of the gear mechanism according to the invention the steps of the stepped pulleys and belt guiding transition zones have cylindrical contact surfaces against the belt. This is an advantage with regard to the manufacture of the pulleys.

A special embodiment of the gear mechanism according to the invention is characterized in that an idle pulley is provided adjacent to one of the stepped pulleys. Hereby it is made possible to disengage the transmission between the two stepped pulleys without stopping the driving motor. The gear mechanism according to the invention may furthermore be so designed that the idle pulley is mounted at the driven stepped pulley and has the same diameter as the highest step of this stepped pulley. An essential advantage of this embodiment consists in that re-engagement of the transmission between the stepped pulleys is always effected at the lowest speed for the driven stepped pulley.

Figure 2:
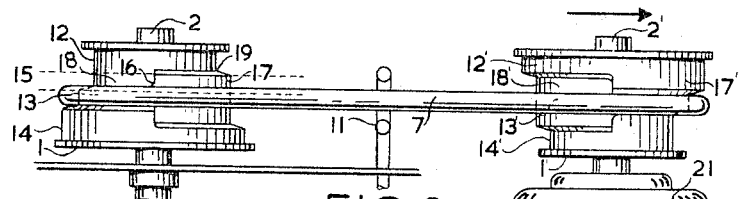
Figure 3:
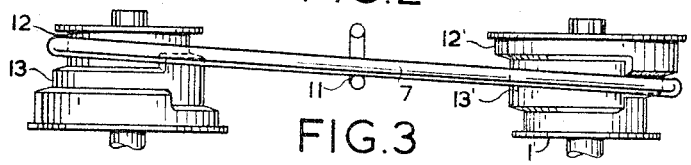
Figure 4:
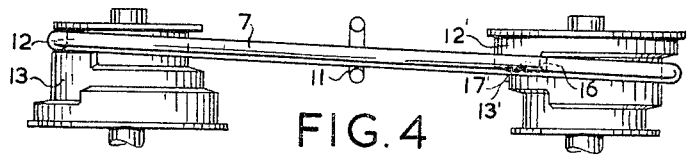
Figure 5:

The invention will be better understood from the following description when read in connection with the accompanying drawing, in which FIG. 1 shows a perspective view of a gear mechanism according to the invention, FIG. 2 shows a plan view of a gear mechanism in normal operation position, FIGS. 3, 4, and 5 show different phases during a change of the gearing ratio for the gear mechanism shown in FIG. 2.

FIG. 1 shows a gear mechanism with two stepped pulleys 1 and 1'. These stepped pulleys are mounted beside each other, each on one of two shafts 2 and 2', respectively. The stepped pulleys 1 and 1' may have an optional number of steps, but in the embodiment shown each has four steps, and on each of the latter belt running surfaces 3, 4, 5, and 6, and 3', 4', 5', and 6', respectively, are provided. The stepped pulleys 1 and 1' are provided with a special transition zone between every two mutually adjacent steps, and the design and effect of this transition zone will be explained later on.

The shaft 2' for the stepped pulley 1' is in the present case supposed to be the shaft of a driving motor 21, while the shaft 2 for the other stepped pulley 1, is in a suitable way journaled in a constructional part 22 and is intended for being given a stepwise variable speed of rotation by means of the gear mechanism. In connection with the stepped pulley 1 a special idle pulley 23 is provided which is located adjacent to the highest step on the pulley, and this idle pulley is in a suitable way journaled so as to be able to rotate freely in relation to the stepped pulley 1.

For transmitting power between the two stepped pulleys a belt 7 is used which in the example shown is of substantially circular cross section. At its outermost steps the stepped pulley 1' is provided with flanges 9' and 10' which serve for guiding the belt on these steps. Almost the same applies to the stepped pulley 1 where flanges 9 and 10 are provided, but where the flange 10 is provided on the idle pulley 23. On the highest step of the stepped pulley 1 there is on half of its circumference provided an elevation 24 on the side facing the idle pulley 23.

A change of the gearing ratio of the gear mechanism is attained by shifting the belt 7 between the belt running surfaces located in line with each other on the stepped pulleys 1 and 1'. Due to the utilization, characteristic of the invention, of a belt guiding transition zone between the individual steps of the stepped pulleys it is, for causing the shifting of the belt, only necessary during the operation of the mechanism, very briefly to exert a force on the belt transversely to its direction of motion. Such an impulsive exertion of a force may e.g. by effected with a suitable tool. It will, however, often be convenient that members serving for effecting this shifting of the belt are provided in the gear mechanism itself. Such a member may be arranged for being able to be moved stepwise in the axial direction of the stepped pulleys and may expediently be placed so that it exerts its force on the belt close to the point where the leading part of the belt enters one of the stepped pulleys for shifting the belt towards a lower step on this stepped pulley. In the embodiment shown in FIG. 1 a U-shaped belt displacement member 11 is used which is mounted approximately halfway between the stepped pulleys and embracing the belt 7 and which member via a rod 25 is in connection with adjustment means, not shown, which make possible a stepwise movement of the belt displacement member in conformity with the belt running surfaces of the stepped pulleys.

FIG. 2 shows a diagrammatical picture of a transmission mechanism with two three-stage stepped pulleys 1 and 1' which are interconnected by means of the belt 7, for the shifting of which between the steps of the stepped pulleys the stepwise movable fork member 11 can be used. For the sake of clarity no idle pulley has been shown here. On each of the steps of the two stepped pulleys, there are belt running surfaces 12, 13, and 14, and 12', 13', and 14', respectively. The stepped pulleys 1 and 1' are in this case made identical so that the path of the belt has the same length irrespective of gearing ratio used between the stepped pulleys. In this way, no great demands are put to the elasticity of the belt so that a considerable power can be transmitted.

To obtain an easy and reliable shifting of the belt between the different steps of the stepped pulleys for the purpose of changing the gearing ratio of the gear mechanism each stepped pulley is between every two adjacent steps provided with a special belt guiding transition zone, as indicated by 15 at the transition between the belt running surfaces 12 and 13 of the stepped pulley 1. On about half of its circumference the stepped pulley is in this transition zone provided with a portion 17, which has the same diameter as the belt running surface 13, and a remaining portion 18 of the belt guiding surface has the same diameter as the belt running surface 12. The junction area between the two portions on the transition zone 15 is so designed that an edge 16 is produced.

In FIG. 2 the belt is supposed to be in a normal operation position on the belt running surfaces 13 and 13', and the stepped pulley 1' is by means of the motor 21 rotated in the direction indicated by an arrow.

To explain the conditions during a change of the gearing ratio in the gear mechanism shown there are in FIGS. 3, 4, and 5 purely diagrammatically shown different phases of the shifting of the belt between the belt running surfaces 13–13' and 12–12', only the stepped pulleys, the belt displacement member, and the belt having been included in these figures. The shifting of the belt is initiated by the fork member 11 being moved upwards, whereby the belt 7 is shifted from the belt running surface 13 down on to the belt running surface 12. This position is shown in FIG. 3. The belt is slackened slightly due to the fact that it has been brought down on to the belt running surface 12 with a smaller diameter, and moreover it will lie slightly obliquely between the two stepped pulleys. During the further shifting, the belt 7 is to be brought up on to the belt running surface 12' on the stepped pulley 1'. When the stepped pulleys have arrived at the position shown in FIG. 4, part of the transition zone has reached such a position that the edge 16 passes under the belt 7. By further rotation from the position shown in FIG. 4 the belt is lifted on to the belt running surface 12' and will shortly reach the position shown in FIG. 5 where the shifting of the belt has been performed and the latter works on the belt running surfaces 12–12'.

From what has been explained, it will appear that the shifting of a belt can be completed in a very short time, and it is not necessary to exert a powerful transverse force on the belt to heel it up on to a step of the stepped pulley with a higher diameter, as the belt after having been subjected to a slight force, so that on one stepped pulley it will drop down on to a lower step, will on the other stepped pulley automatically be led up on to a higher step by means of the belt guiding transition zone. It is pointed out that the belt displacement member is used only for starting the shifting of the belt, as after a short impulse the belt will itself make its way on to the other belt running surface without any perceptible wear on the side of the belt by the belt displacement member. It should furthermore be pointed out that the shifting of the belt need not necessarily be initiated from the starting position shown in FIG. 2, but can be initiated at any time during the rotation of the gear mechanism. A shifting of the belt back from the belt running surfaces 12–12' and 13–13' and further on to the next step on the stepped pulleys is performed in a similar way as described above with the exception that here the fork member is moved in the opposite direction.

As indicated by 19 in FIG. 2, the stepped pulleys are at each transition from a smaller to a larger diameter designed with an oblique transition surface. This gives a more favorable guiding of the belt on the different belt running surfaces.

The transition surface between the portions 17 and 18 in the belt guiding zone may wholly or partly be a concave conical surface with a radial axis. The edge 16 on this surface facing the belt may be provided with a hollow space as shown by 20 in FIG. 1. Such a hollow space is particularly advantageous when a circular belt is used, as the hollow space 20 will catch the belt and guide it during its transport on to a higher step.

The idle pulley 23 shown in FIG. 1 in connection with the stepped pulley 1 can be used for disengaging the transmission between the stepped pulleys 1 and 1'. This may in many cases be a more convenient method of stopping the rotation of the shaft 2 than having to stop the motor 21. The highest step on the stepped pulley 1 is in this case provided with a projecting portion 24 on half of its circumferenece. This portion serves for guiding the belt on the idle pulley 23. The shifting of the belt 7 to and from the idle pulley is performed by means of the belt displacing member 11, and the stepped pulley 1' is in this case so designed that its lowest step has a width corresponding to twice the normal step width. The construction shown offers inter alia the advantage that when an engagement is performed it will always be initiated at the lowest speed for the driven stepped pulley.

It will be seen that the portions 17 in the successive belt guiding transition zones are displaced 180° in relation to each other on the circumference of the stepped pulleys. Hereby a better weight distribution of the mass of the stepped pulleys around the axis of rotation is ensured.

The width of the belt guiding zone 15 should not generally be less than half the width of the belt 7.

The invention is not limited to the embodiments shown, as within the scope of the invention many modifications and adaptations to special purposes of application can be performed.

I claim:

1. A gear mechanism comprising two parallel shafts each provided with a stepped pulley, a belt interconnecting said pulleys, means for shifting said belt between the steps of the pulleys for varying the gearing ratio of the gear mechanism, said stepped pulleys comprising between every two adjacent steps a transition zone having a width adapted to the belt and having on one part of the circumference a cylindrical shape with a radius corresponding to the adjacent higher step and on substantially the remaining part of the circumference a radius corresponding to the adjacent lower step, said shifting means being arranged to act momentaneously on said running belt, during operation to make said running belt shift in a jump-like manner from a lower to a higher step.

2. A gear mechanism as claimed in claim 1 wherein said shifting means comprises a guided belt displacement member arranged for being moved stepwise, said member comprising a rod and a U-shaped member embracing the belt.

3. A gear mechanism as claimed in claim 2 wherein said belt displacement member is adjacent to each of said two pulleys and arranged at the sides where the leading parts of the belts enter the pulleys.

4. A gear mechanism as claimed in claim 1 wherein at least one junction between the two parts of the transition zones, having large and small radii, respectively, is concave.

5. A gear mechanism as claimed in claim 4 wherein said junction defines a hollow space at the side of the transition zone closest to the higher step and thereby a projecting edge at the side facing the lower step.

6. A gear mechanism as claimed in claim 1 wherein said parts of the stepped pulleys, having the largest diameter, extend corresponding to at least half the circumference of the pulleys.

7. A gear mechanism as claimed in claim 1 wherein said parts of the transition zones, having the largest radii, are displaced 180° in relation to each other.

8. A gear mechanism as claimed in claim 1 wherein the steps of the pulleys and the transition zone have cylindrical contact surfaces against the belt.

9. A gear mechanism as claimed in claim 1 wherein an idle pulley is provided adjacent to one of said stepped pulleys.

10. A gear mechanism as claimed in claim 9 wherein said idle pulley is provided at the driven stepped pulley, and has the same diameter as the highest step of said stepped pulley.

References Cited by the Examiner

UNITED STATES PATENTS

| | | | |
|---|---|---|---|
| 268,763 | 12/1882 | Woodward | 74—242.7 X |
| 1,288,339 | 12/1918 | Widmer | 74—242.3 |
| 2,377,697 | 6/1945 | Kenworthy | 74—242.4 |

FOREIGN PATENTS 2,705    1908    Great Britain.

DAVID J. WILLIAMOWSKY, *Primary Examiner.*

J. A. WONG, *Assistant Examiner.*